United States Patent [19]

Conradi

[11] Patent Number: 4,787,487

[45] Date of Patent: Nov. 29, 1988

[54] ARTICULATED LINKAGE ASSEMBLY FOR A SURGE BRAKE

[75] Inventor: Eugene P. Conradi, Des Moines, Iowa

[73] Assignee: Dico Company, Inc., Des Moines, Iowa

[21] Appl. No.: 55,235

[22] Filed: May 28, 1987

[51] Int. Cl.[4] .......................... F16D 51/00; B60T 7/20
[52] U.S. Cl. ................................ 188/328; 188/112 R
[58] Field of Search ...................... 188/78, 112 R, 327, 188/328, 325, 141, 142, 341; 280/446 R; 74/519, 532

[56] References Cited

U.S. PATENT DOCUMENTS

| | | | |
|---|---|---|---|
| 1,912,217 | 5/1933 | Pentz | 188/328 X |
| 2,973,839 | 3/1961 | De Puydt et al. | 188/112 |
| 3,973,655 | 8/1976 | Mollard | 188/112 X |
| 4,232,765 | 11/1980 | Rupprecht | 188/78 |

*Primary Examiner*—Andres Kashnikow
*Assistant Examiner*—Robert J. Oberleitner

*Attorney, Agent, or Firm*—Rudolph L. Lowell

[57] ABSTRACT

An improved surge braking mechanism for trailer vehicles including a brake shoe carried on a lever plate by an articulated linkage system. The braking mechanism moves the lever plate to bring the brake shoe into braking engagement with a brake drum of the trailer vehicle in response to the forward inertia of the trailer vehicle during braking. When the inertia of the trailer vehicle is either neutral or rearward, the braking mechansim acts to take the brake shoe out of braking engagement with the brake drum. The articulated linkage system limits the movement of the brake shoe away from the brake drum during rearward movement of the trailer vehicle. Upon transitional motion of the brake shoe in response to forward movement of the trailer vehicle, the brake shoe is smoothly returned to its normal position ready for braking of such forward movement. Undesired temporary braking engagement of the brake-shoe observed during such transitional movement in known surge braking mechanisms is thereby prevented.

4 Claims, 6 Drawing Sheets

ARTICULATED LINKAGE ASSEMBLY FOR A SURGE BRAKE

BACKGROUND OF THE INVENTION

The invention relates generally to surge brakes for use in braking trailer vehicles, and more specifically to an improved articulated brake shoe for use in surge brake mechanisms of trailer vehicles.

Surge brake mechanisms are widely used on trailer vehicles to provide a means for braking the forward movement of such vehicles independent of direct control or power from a towing vehicle. Known surge brake systems rely on hydraulic actuators which are operated in response to the forward inertia of the trailer vehicle acting on a decelerating tractor vehicle. Whenever the trailer vehicle is moving relatively toward the tractor vehicle, telescoping members of an actuator unit of a conventional surge brake mechanism will supply pressurized fluid to operate the trailer braking mechanism. The surge brake thus operates to brake a forwardly moving trailer vehicle in response to braking action of its tractor vehicle. Pressurized fluid will also be supplied by the actuator unit, however, if the tractor vehicle is used to back up a trailer vehicle. The surge brake mechanism must, therefore, discriminate between the braking motion of a tractor vehicle wherein the trailer braking action is desired, and backing up of the tractor vehicle wherein a trailer braking action is not desired.

Surge braking mechanisms which effectively discriminate between the two situations are known in the art. One example of such a mechanism is disclosed in U.S. Pat. No. 2,973,839. These mechanisms rely on the fact that the wheel of the trailer vehicle is rotating in a forward direction when the trailer braking operating is desired and is rotating in an opposite or reverse direction when a trailer braking operation is not desired. It has been noticed, however, that a "catch" or abrupt application of the braking mechanism can occur in conventional mechanisms shortly after the transition from a rearward movement of the trailer vehicle to a forward movement thereof. This sudden application of the trailer vehicle brakes is thought to be a result of the relatively large amount of "play" or articulation permitted between the articulated brake shoes of the trailer brake mechanisms and their associated supporting lever arms or plates. During such transitional movement, the articulated brake shoes move from a contact position with the brake drum to a normal towing position free of the brake drum. However, in the transition it appears that the brake shoe overruns its normal towing position and engages the brake drum of the trailer vehicle resulting in a sudden but temporary application of the trailer brake.

The present invention provides a novel articulated linkage system between the articulated brake shoe ad its supporting lever which acts to limit the amount of "play" between the articulated brake shoe and its supporting lever so as to eliminate the sudden application of the trailer vehicle brakes during the transition from rearward movement to a forward or towing movement of the trailer vehicle.

SUMMARY OF THE INVENTION

The invention consists of an improved articulated linkage assembly for surge braking mechanisms used on trailer vehicles. Such surge braking mechanisms include a brake drum and an articulated brake shoe that is carried on a pivotable lever plate for movement into braking engagement with the brake drum in response to the action of forward inertia of the trailer vehicle on braking of the tractor vehicle and out of braking engagement when the trailer vehicle is being "backed up". The lever plate of the articulated linkage assembly includes a centrally located kidney-shaped aperture. A gusset plate across the arch of the arcuate brake shoe includes a linkage pin which extends through the kidney-shaped aperture for limiting relative movement of the gusset plate and brake shoe relative to the lever plate. A pear-shaped aperture in the gusset plate is displaced relative to the pin toward the pivoted end of the lever plate. A biasing spring extends from the pin through the pear-shaped aperture and is anchored in the lever plate to bias the brake shoe out of braking engagement. A second, reversed pear-shaped aperture perforates the lever arm at a position displaced substantially tangentially of the pin and inwardly of the pear-shaped aperture of the gusset plate. A pin or bolt attached to the gusset plate extends through the reversed pear-shaped aperture to prevent braking engagement of the brake shoe with the brake drum upon transition of the trailer vehicle from a "back up" movement to a forward movement.

BRIEF DESCRIPTION OF THE DRAWINGS

FIGS. 4a and 4b are detail plan views of a portion of the brake shoe linkage assembly, wherein FIG. 4b shows movement of the upper portion of the brake shoe from the dotted line position to the solid line position;

DETAILED DESCRIPTION OF A PREFERRED EMBODIMENT

Figure 1:
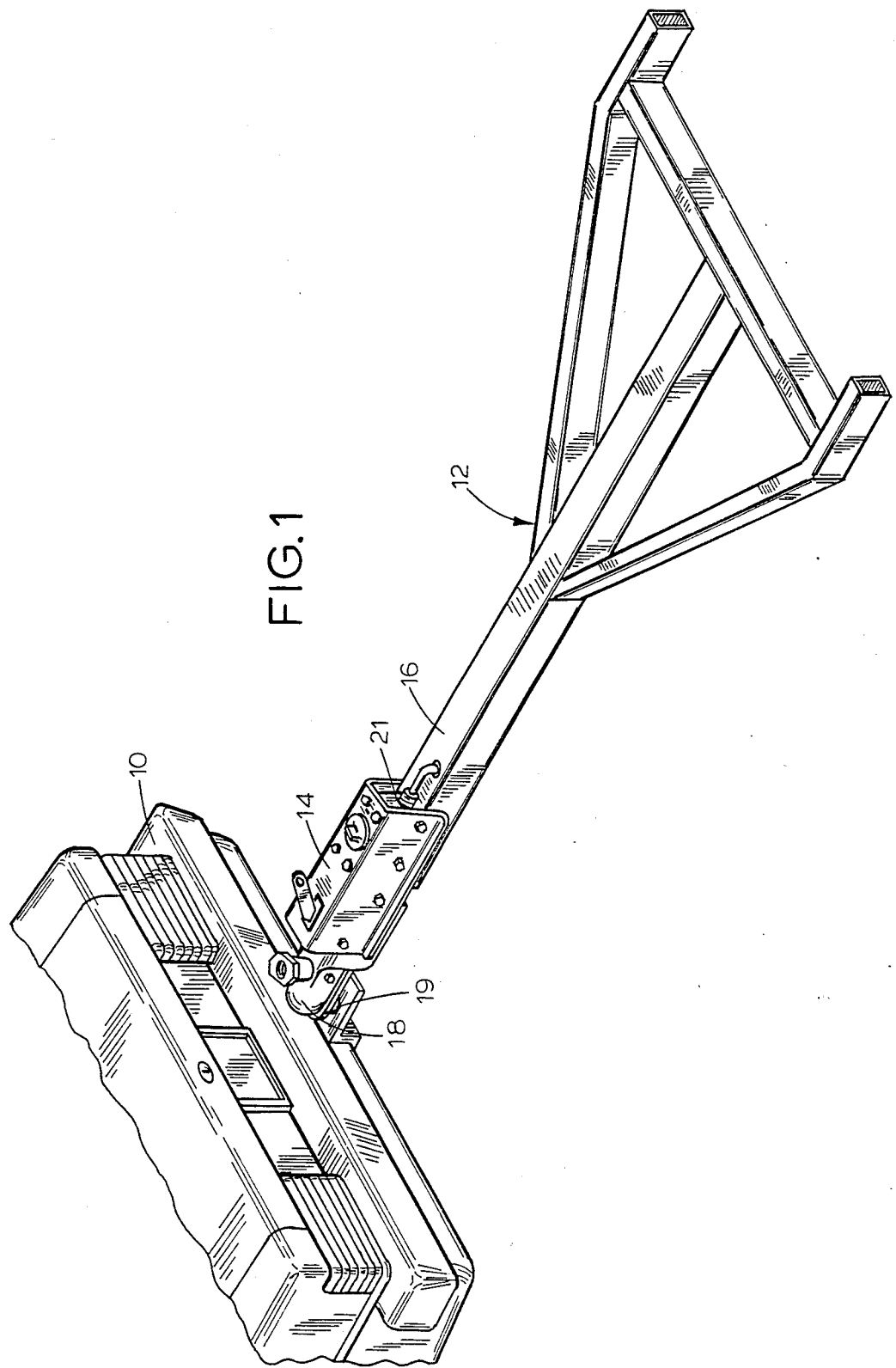
FIG. 1 is a perspective view of the rear portion of a tractor vehicle and the front portion of a trailer vehicle embodying the brake mechanism of this invention.

With reference to the drawings, there is illustrated in FIG. 1 a tractor vehicle 10 connected to a trailer vehicle 12 by means of an extensible and retractable brake actuator unit 14 of a conventional design for supplying fluid under pressure to a trailer brake mechanism to be described in detail below. The actuator 14 is supported on a tongue member 16 and includes telescoping members for relative movement in response to relative movement between the tractor vehicle 10 and the trailer vehicle 12. The forward end portion of the tongue 16 includes a socket member 18 for receiving the usual ball 19 carried on the tractor vehicle 10. The telescoping members of actuator 14 permit relative extension and retraction of the socket member 18 with respect to the tongue 16. Upon relative extension of the socket member 18 away from tongue 16, no pressurized oil is supplied by the actuator 14 to the trailer brake mechanism from a hydraulic unit indicated generally at 21. Upon retraction of the socket member 18, however, the telescoping members of the actuator 14 operate the unit 21 to supply pressurized oil to the trailer brake mechanisms.

It is seen, therefore, that in the surge brake system herein described, on forward movement of the trailer vehicle 12 relative to the tractor vehicle 10, the unit 21 is operated in response to relative movement between the telescoping members to supply oil under pressure to the trailer brake mechanism. This operation will take place upon application of the brakes of the tractor vehicle 10 during a towing operation due to the forward inertia of the trailer 12. It will be understood that oil under pressure will also be supplied to the brake mechanisms when the tractor vehicle 10 is moved rearwardly relative to the trailer 12.

Figure 2:
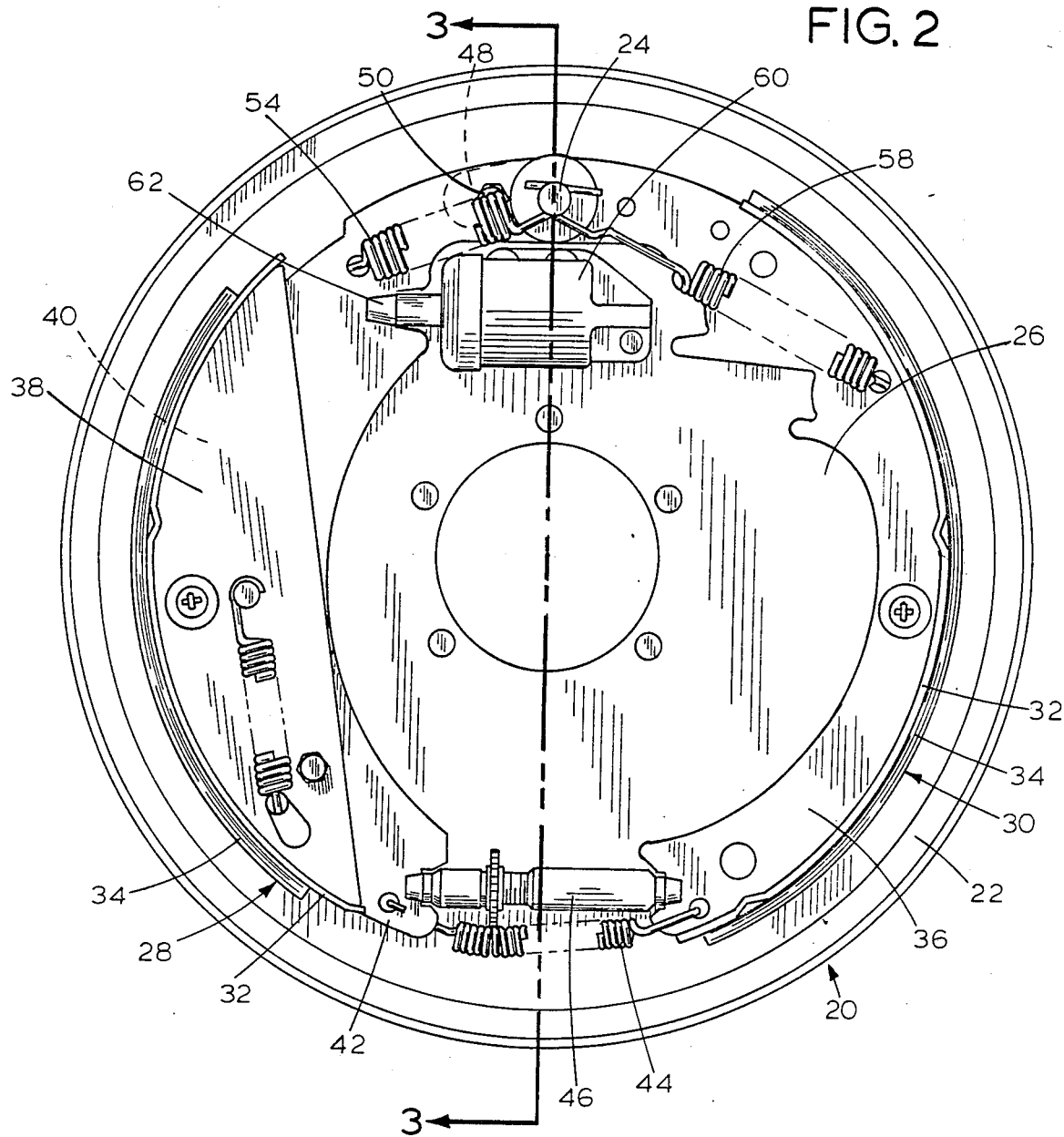
FIG. 2 is a vertical sectional view taken transversely of the trailer wheel axle and showing a brake drum and associated brake shoe linkage assembly of this invention.

The trailer 12 is supplied with conventional wheels (not shown) each of which includes a braking mechanism illustrated generally at 20 in FIG. 2 only one of which, however, will be described. The braking mechanism 20 is automatically operated in response to the relative retraction of the telescoping members of the actuator 14 and includes a brake drum 22 rotatable with and supported on the trailer wheel. Positioned within the brake drum 22 is a supporting pin 24 mounted on a coverplate 26 for closing the inner or open side of the brake drum 20. Operatively associated with the brake drum 22 are a pair of articulated brake shoes 28 and 30 each of which includes an arcuate support 32 for a brake lining 34. Brake shoe 30 includes an arcuate lever plate 36 extended in an overlying relation to the arch of the support 32. The other brake shoe 28 includes an arcuate lever plate 42 which is received between an outer gusset plate 38 and an inner gusset plate 40, extended across the arch of the corresponding support 32.

Figure 4A:
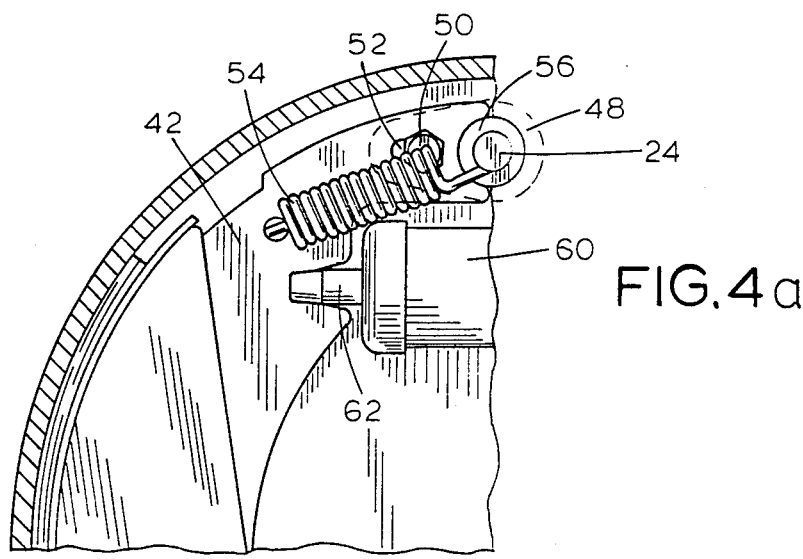
Figure 4B:
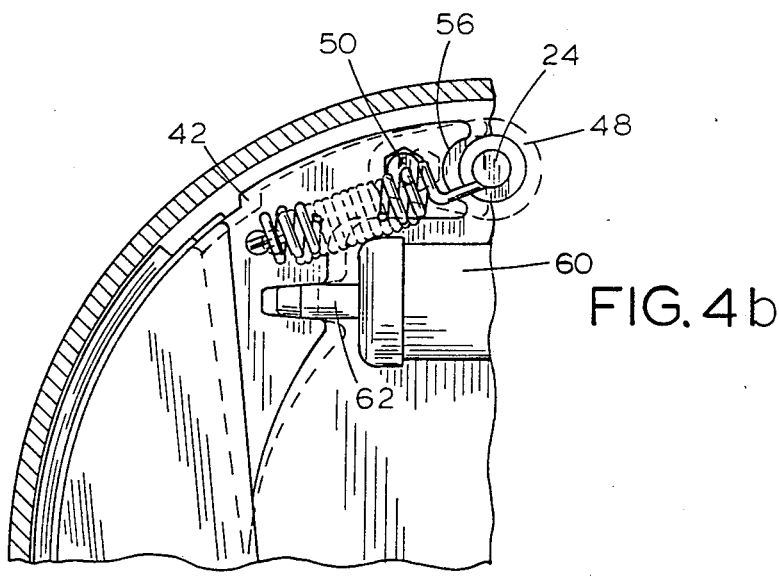

The pair of lever plates 42 and 36 are linked together at their lower ends by a spring 44 and extension screw 46 combination for adjustment of the relative movement between the adjacent lower ends of the lever plates. The upper end portion of the lever plate 42 is linked to the support pin 24 by an attachment linkage 48 and bolt 50. Attachment linkage 48 is an ovoid plate having a circular hole at one end and an elongated hole or slot 52 at its other end (FIGS. 4a and 4b). The attachment linkage 48 is mounted for pivotal movement about the circular hole in which is received the support pin 24. Additionally, the bolt 50 of the lever plate 42 is received in the slot 52. Through this connection, the upper end portion of lever plate 42 can move toward or away from support pin 24 by an amount equal to the range of motion permitted by the movement of the bolt 50 within slot 52. A spring 54 between the lever plate 42 and the support pin 24 biases the upper end portion of lever plate 42 to its closest relative position to support pin 24.

The upper end portion of lever plate 42 terminates in an arcuate depression 56 which, as illustrated in FIGS. 4a and 4b, abuts support pin 24 when lever plate 42 is in its normal or rest position, as limited or defined by the support pin 24. Note that the shape of arcuate depression 56 permits pivotal motion of the lower end portion of lever arm 42 with respect to support pin 24 in response to adjustments in the length of extension screw 46 as described above. In a similar manner, the upper end portion of lever plate 36 terminates in an arcuate depression that is urged against support pin 24 by biasing spring 58 so as to permit relative pivotal movement of the lower end of lever plate 36 with respect to support pin 24.

Referring again to FIG. 2, the lower end portions of lever plates 36 and 42 are kept in contact engagement with the ends of extension screw 46 by the spring 44. It is seen, therefore, that increasing the length of the extension screw 46 will move the brake shoes 28 and 30 outwardly thereby moving them closer to the inner periphery of the brake drum 22. Conversely, decreasing the length of extension screw 46 will move the brake shoes 28 and 30 inwardly thereby moving them away from the inner periphery of brake drum 22.

Mounted on the inside cover 26 below support pin 24 is a cylinder assembly 60 operable in response to the supply thereto of oil under pressure from the hydraulic unit 21 of the actuator 14 mounted on the tongue 16 of the trailer 12 (FIG. 1). The supply of pressurized oil to the cylinder assembly 60 will act to extend a piston rod 62, the end portion of which is slotted to receive an upper portion of lever plate 42 therein. Accordingly, pressurized oil supplied to cylinder assembly 60 will act to move the upper end portion of lever plate 42 away from support pin 24, from the dotted line position to the solid line position of FIG. 4b, extending spring 54 and thereby moving the brake shoe 28 toward braking engagement with the brake drum 22.

The gusset plates 38 and 40 of brake shoe 28 are operatively coupled with lever plate 42 by means of an articulated linkage assembly, generally indicated at 64 in FIGS. 5-8. The articulated linkage assembly 64 consists primarily of gusset plates 38 and 40 and the lever plate 42, each of which have a number of specially shaped apertures or slots into which are positioned associated pins or bolts that define and limit the relative movement of the brake shoe 28 with respect to the lever plate 42. Outer and inner gusset plates 38 and 40 are perforated by four apertures, a pair of circular apertures 66 and 68, a slot 70, and a generally pear-shaped aperture 72. Corresponding to the apertures 66-72 of the gusset plates 38 and 40 are apertures 74-80, respectively, in the intervening lever plate 42. As illustrated in FIGS. 5-8, aperture 74 is kidney-shaped; aperture 76 is generally pear-shaped with its smaller end toward the lower end of lever plate 42; aperture 78 is an elongated hole or slot extended generally radially of the brake drum 22; and aperture 80 is circular and of a diameter or width substantially equal to the transverse width of the smaller end of pear-shaped aperture 72 of the gusset plates 28 and 40.

The articulated linkage system 64 also includes a number of linkage pins or elements carried in the corresponding apertures of the gusset plates and the lever plate for interconnecting the gusset plates to the lever plate. Thus, linkage pin 82 is inserted through the circular aperture 66 in inner gusset plate 40, through kidney-shaped aperture 74 of lever plate 42 and circular aperture 66 of outer gusset plate 38. The pin 82 fits snugly within the circular apertures 66 in the inner and outer gusset plates but is movable within the kidney-shaped aperture 74. In a similar manner, a nut and bolt combination 84 is inserted through the circular apertures 68 of the inner and outer gusset plates 38 and 40 and within pear-shaped aperture 76 of the lever plate 42. The bolt 84 fits snugly in the circular apertures 68 but is movable within the confines of the pear-shaped aperture 76.

Figure 3:
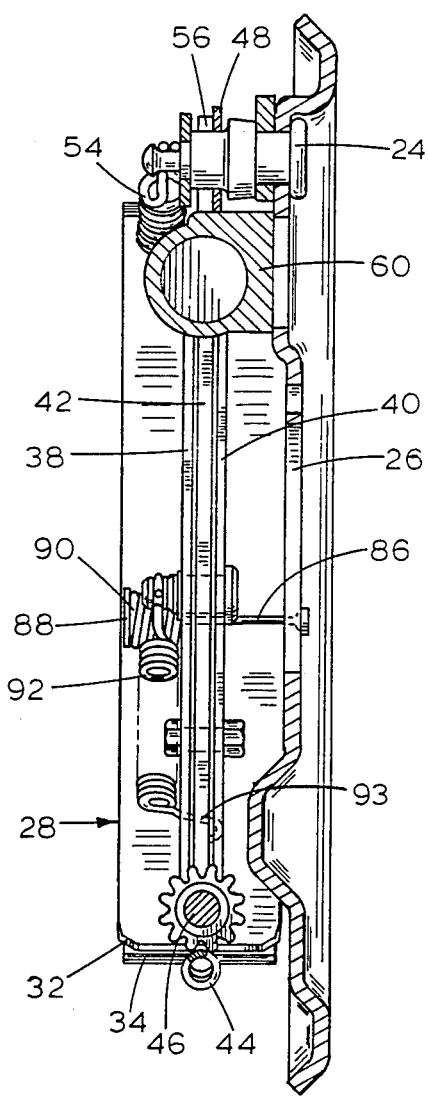
FIG. 3 is a sectional view taken along the line 3—3 in FIG. 2.

A post member 86 supported by cover plate 26 extends from cover plate 26 outwardly through the slots 70 and 78 of the gusset plates and the lever plate, respectively, to receive, as illustrated in FIG. 3, a washer 88 on its outer end portion to retain a compression spring 90 which acts to urge brake shoe 28 inwardly to a central, operative position.

Figure 5:
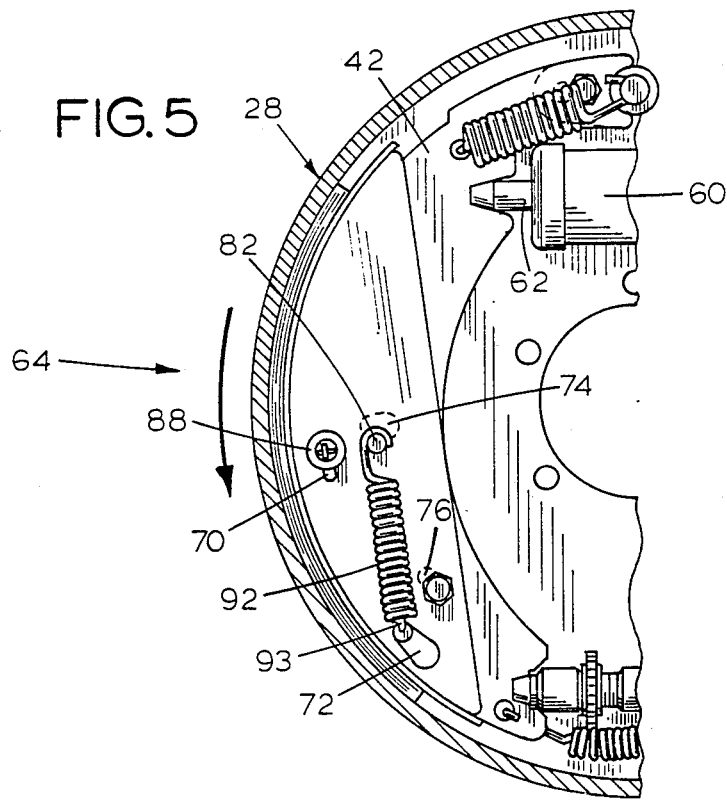
FIGS. 5 and 6 are reduced detail views of portions illustrated in FIG. 2 and showing parts of the brake shoe linkage assembly in changed positions.
Figure 6:
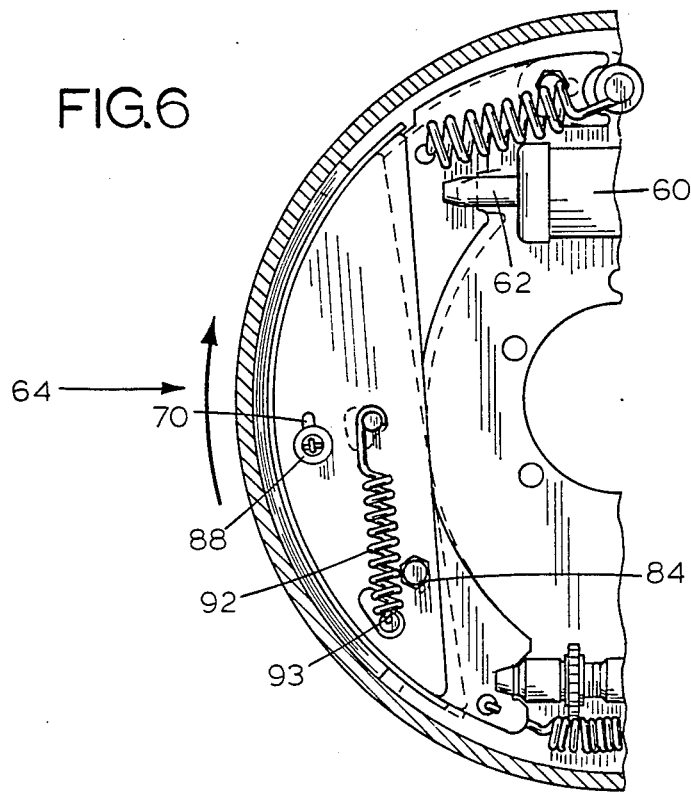

Circular aperture 80 of lever plate 42 is substantially aligned below pear-shaped aperture 72 of the outer support plate 38. As shown in FIGS. 3, 5, and 6, a yieldable means or spring 92 has its upper end secured to pin 82 and its lower or stop end 93 inserted into apertures 72 and 80. The spring 92, together with the linkage pins and apertures, acts to urge brake shoe 28 to its normal or rest position relative to lever plate 42, as illustrated in FIG. 5.

Figure 7:
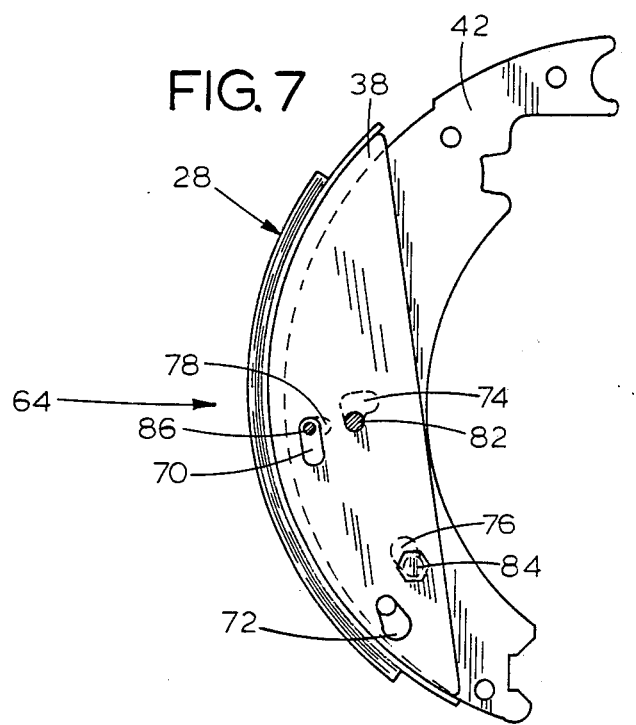
FIGS. 7 and 8 are detail sectional views illustrated similarly to FIGS. 5 and 6, with parts broken away and showing other parts in changed positions corresponding to the full line positions in FIGS. 5 and 6, respectively.

During ordinary, forward towing of the trailer vehicle 12 (FIG. 1) the wheel is rotating in the direction of the arrow in FIG. 5. In the absence of braking of the tractor vehicle, the piston 62 of cylinder assembly 60 is in its retracted position, as illustrated in FIG. 4a. The articulated linkage system 64 under these conditions is as illustrated in FIG. 5. Spring 92, acting between circular aperture -80 and pin 82, urges the gusset plates 38 and 40 and the associated brake shoe 28 downwardly with respect to the lever plate 42 wherein the substantially tangential leg of the kidney-shaped aperture 74 abuts the pin 82. If the tractor vehicle is now braked, the inertia of the trailer vehicle will cause pressurized hydraulic fluid to be supplied from the actuator unit 14 to the cylinder assembly 60 resulting in the extension of the piston 62. The lever plate 42 is, accordingly, moved from the dotted-line position to the solid-line position of FIG. 4b, as defined by the movement of the bolt 50 within the slot 52. The lever plate 42 will thereby move the brake shoe 28 into contact with the inner periphery of the brake drum 22. Friction between the brake shoe 28 and the brake drum 22 of the forward-rolling wheel will further urge the brake shoe 28 downwardly with respect to the lever plate 42, in the same direction as the action of spring 92. As illustrated in FIG. 7, the limited movement of the pins within their associated apertures of the articulated linkage system 64, however, do not permit further downward movement of the brake shoe 28 as pin 82 abuts the lower edge of the kidney-shaped aperture 74, the bolt 84 abuts the lower edge of the smaller end of the pear-shaped aperture 76, and the upper edge of the slot 70 abuts the post member 86. The brake shoe 28 is thus held in braking engagement with the brake drum 22 and the trailer vehicle will be effectively braked a desired.

If the trailer vehicle is now to be moved rearwardly at a constant speed by the tractor vehicle, the trailer wheel will turn in the direction of the arrow in FIG. 6. The spring 92 of the articulated linkage system 64 holds the brake shoe 28 in the normal or rest position shown in dotted-line in FIGS. 6 and 8, identical except for the direction of rotation of the wheel to that illustrated in FIGS. 5 and 7. Rearward acceleration of the tractor vehicle, however, while "backing-up" the trailer vehicle will have the effect of retracting the telescoping members of the brake actuator unit 14 (FIG. 1). Pressurized hydraulic fluid will accordingly be delivered to the cylinder assembly 60 to extend piston 62. The lever plate 42 is thus moved from the dotted-line to the solid-line position of FIG. 6, thereby bringing the brake shoe 28 into contact with the inner periphery of the brake drum 22.

Figure 8:
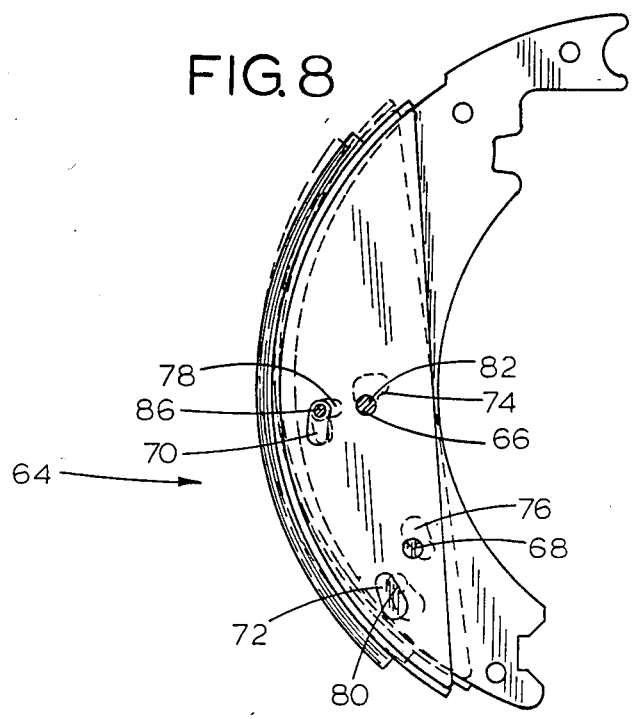

Brake drum 22 is now rotating in the direction of the arrow of FIG. 6, that is, the opposite direction to that discussed above. Accordingly, friction between the brake drum 22 and the brake shoe 28 will act to urge the gusset plates 38 and 40 and the associated brake shoe 28 upwardly and inwardly with respect to the lever plate 42. The articulated linkage system 64 will permit such upward and inward movement, resulting in the extension of spring 92, to the solid-line position thereof as shown in FIGS. 6 and 8 whereby the brake shoe 28 is moved out of braking engagement with the brake drum 22. The trailer vehicle can thus be "backed up" without the surge brake system actuating the trailer vehicle brakes.

It is important to note the movement of the brake shoe 28 and associated gusset plates 38 and 40 relative to the lever plate 42 when the trailer vehicle is accelerated rearwardly. Such movement, illustrated by their movement from the dotted-line position to the sold-line position in FIGS. 6 and 8, is a combination of upward and inward movement substantially as defined by the range of motion of the pin 82 within the kidney-shaped aperture 74. Further, the bolt 84 and the stop end 93 of the spring 92 move from the smaller end to the larger end of the pear-shaped apertures 76 and 72, respectively. While located at the smaller ends of the pear-shaped apertures 76 and 72, as illustrated in FIGS. 5 and 7, little or no inward movement of the gusset plates 38 and 40 with respect to the lever plate 42 is permitted. That is, the brake shoe 28 will be firmly held in braking engagement with the brake drum 22 should the braking mechanism be actuated. In contrast, when the bolt 84 and the stop end 93 of the spring 92 are at the larger end of the pear-shaped apertures, a substantial amount of articulation or inward movement permits the brake shoe 28 to move out of braking engagement with the brake drum 22. Such inward and upward movement is, however, limited or defined by the shape of the pear-shaped apertures 76 and 72.

In conventional surge brake mechanisms, an abrupt, temporary braking action is observed when a trailer vehicle is first moved forwardly after having been "backed-up" or moved rearwardly. As discussed above, such rearward movement resulted in the upward and inward movement or displacement of the brake shoe. The transition to the rotation of the wheel in a forwardly direction (FIG. 5) causes the brake shoe of the conventional braking mechanism to move suddenly downwardly and outwardly as it returned to its normal position ready to brake the forwardly moving trailer vehicle. This sudden movement brings the brake shoe into contact engagement with the brake drum which thus acts to wedge the brake shoe against the lever plate and temporarily into braking engagement. The present articulated linkage system 64 effectively prevents this undesired transitional braking effect. The inward movement of the brake shoe 28, particularly its lower portion, is limited by the pear-shaped apertures 72 and 76 in cooperation with the bolts 84 and the stop end 93 of the spring 92. By limiting the inward movement or displacement of the lower portion of the brake shoe 28, the change in direction of rotation of the brake drum during the transitional rotation of the wheel does not forcefully return the brake shoe 28 to its normal position, but instead the return is less abrupt so as to eliminate any wedging and resultant temporary braking effect. By limiting the movement of the brake shoe 28 from its normal position, the return at transition does not "overrun" the normal position to temporarily be in braking engagement.

It should be clear from the foregoing description of the preferred embodiment that other means could be employed in accomplishing the broad purposes of the invention. It should be understood that description is intended to illustrate but not to limit the scope of the invention as defined in the following claims.

I claim:

1. In a surge brake system for a tractor-trailer combination, wherein the brake system includes a brake drum and an articulated brake shoe carried on a lever plate for movement into braking engagement with the brake drum in response to the action of forward inertia of the trailer relative to the tractor and out of braking engagement in response to at least one of neutral or rearward inertia of the trailer relative to the tractor, an articulated linkage assembly, comprising:
    (a) plate means movably supporting the brake shoe;
    (b) linkage means interconnecting said plate means to said lever plate for limited movement of the brake shoe between a non-braking contact position with the brake drum under a condition of at least one of neutral or rearward inertia of the trailer and a position of braking engagement under a condition of forward inertia of the trailer; and
    (c) yieldable means between said plate means and the lever plate for urging the brake shoe into a rest position therefor, wherein said linkage means, on movement of the trailer from a condition of forward inertia to a condition of rearward inertia, limits the movement of said brake shoe to a non-braking contact position whereby said yieldable means acts to urge the brake shoe to said rest position.

2. The articulated linkage assembly as defined in claim 1, wherein:
    (a) said plate means includes at least one gusset plate substantially adjacent the lever plate and overlying the brake shoe;
    (b) said linkage means includes a plurality of linkage pins and associated apertures formed in said gusset plate and said lever plate; and
    (c) said yieldable means is a spring.

3. The articulated linkage assembly as defined in claim 1, wherein:
    (a) said plate means is a pair of spaced-apart gusset plates overlying the arch of said brake shoe; and
    (b) the lever plate is received for movement between said gusset plates.

4. In a surge brake system for a tractor-trailer combination, wherein the brake unit includes a brake drum and an articulated brake shoe carried on a lever plate for movement into braking engagement with the brake drum in response to the action of forward inertia of the trailer relative to the tractor and out of braking engagement in response to at least one of neutral or rearward inertia of the trailer relative to the tractor, an articulated linkage assembly, comprising:
    (a) a gusset plate substantially adjacent the lever plate land overlying the brake shoe;
    (b) the lever plate having a centrally located and substantially kidney-shaped aperture, said lever plate including a fulcrum end portion;
    (c) a first pin extended from said gusset plate through said kidney-shaped aperture for limiting the movement of said gusset plate relative to said lever plate;
    (d) said gusset plate having a first pear-shaped aperture displaced from said first pin toward the fulcrum end of the lever plate;
    (e) a spring for urging the brake shoe into a rest position, said spring having one end attached to said first pin and the opposite end thereof attached to the lever plate through said first pear-shaped aperture;
    (f) said lever arm having a second pear-shaped aperture reversed relative to said first pear-shaped aperture and displaced substantially along the same arc of curvature of said first pin and inwardly of said first pear-shaped aperture; and
    (g) a second pin attached to said gusset plate and extended through said second pear-shaped aperture wherein a limited movement of said pins in associated ones of said apertures on movement of the trailer from a condition of forward inertia to a condition of rearward inertia, limits the movement of said brake shoe to a non-braking contact position concurrently with the action of said yieldable means to urge the brake shoe to said rest position.

* * * * *